(12) United States Patent  (10) Patent No.: US 8,276,334 B2
Mathews et al.  (45) Date of Patent: *Oct. 2, 2012

(54) CABLE ANCHOR

(75) Inventors: Thomas F. Mathews, Fort Worth, TX (US); Stan Landry, Euless, TX (US); Robert K. Van Noord, Dallas, TX (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,946

(22) Filed: Oct. 12, 2011

(65) Prior Publication Data

US 2012/0031035 A1    Feb. 9, 2012

Related U.S. Application Data

(63) Continuation of application No. 12/120,503, filed on May 14, 2008, now Pat. No. 8,051,615.

(60) Provisional application No. 60/938,366, filed on May 16, 2007.

(51) Int. Cl.
*E04C 5/12* (2006.01)
*F16C 11/02* (2006.01)

(52) U.S. Cl. ............... 52/223.13; 52/223.6; 52/223.7; 52/711; 403/78

(58) Field of Classification Search ............ 52/146, 52/148, 149, 152, 223.13, 223.6, 223.7, 711; 403/78

See application file for complete search history.

(56) References Cited

U.S. PATENT DOCUMENTS

| | | | | | |
|---|---|---|---|---|---|
| 1,829,964 | A | * | 11/1931 | Randall ........................ | 403/38 |
| 2,905,491 | A | * | 9/1959 | Olson .......................... | 403/44 |
| 3,143,365 | A | * | 8/1964 | Egger .......................... | 403/77 |
| 3,858,846 | A | * | 1/1975 | Schmid ...................... | 254/29 A |
| 4,188,681 | A | * | 2/1980 | Tada et al. .................. | 14/73.5 |
| 4,691,988 | A | * | 9/1987 | Tremblay et al. ........... | 385/136 |
| 4,899,499 | A | * | 2/1990 | Hoekstra .................... | 52/146 |
| 4,966,163 | A | * | 10/1990 | Kraus et al. ................. | 600/585 |
| 5,278,353 | A | * | 1/1994 | Buchholz et al. ........... | 174/84 R |
| 5,330,143 | A | * | 7/1994 | Rich et al. .................. | 248/161 |
| 6,767,153 | B1 | * | 7/2004 | Holbrook .................... | 403/56 |
| 7,644,500 | B2 | * | 1/2010 | Schmidt et al. ............ | 29/898.044 |
| 7,823,344 | B2 | * | 11/2010 | Shin ............................ | 52/223.13 |
| 8,015,774 | B1 | * | 9/2011 | Sorkin ........................ | 52/745.21 |

* cited by examiner

*Primary Examiner* — Phi Dieu Tran A

(74) *Attorney, Agent, or Firm* — Quarles & Brady LLP

(57) ABSTRACT

A cable anchor has ball surfaces that permit misalignment between the cable and a stem of the anchor, and a fitting that permits the introduction of a corrosion inhibitor to the interior of the anchor.

20 Claims, 3 Drawing Sheets

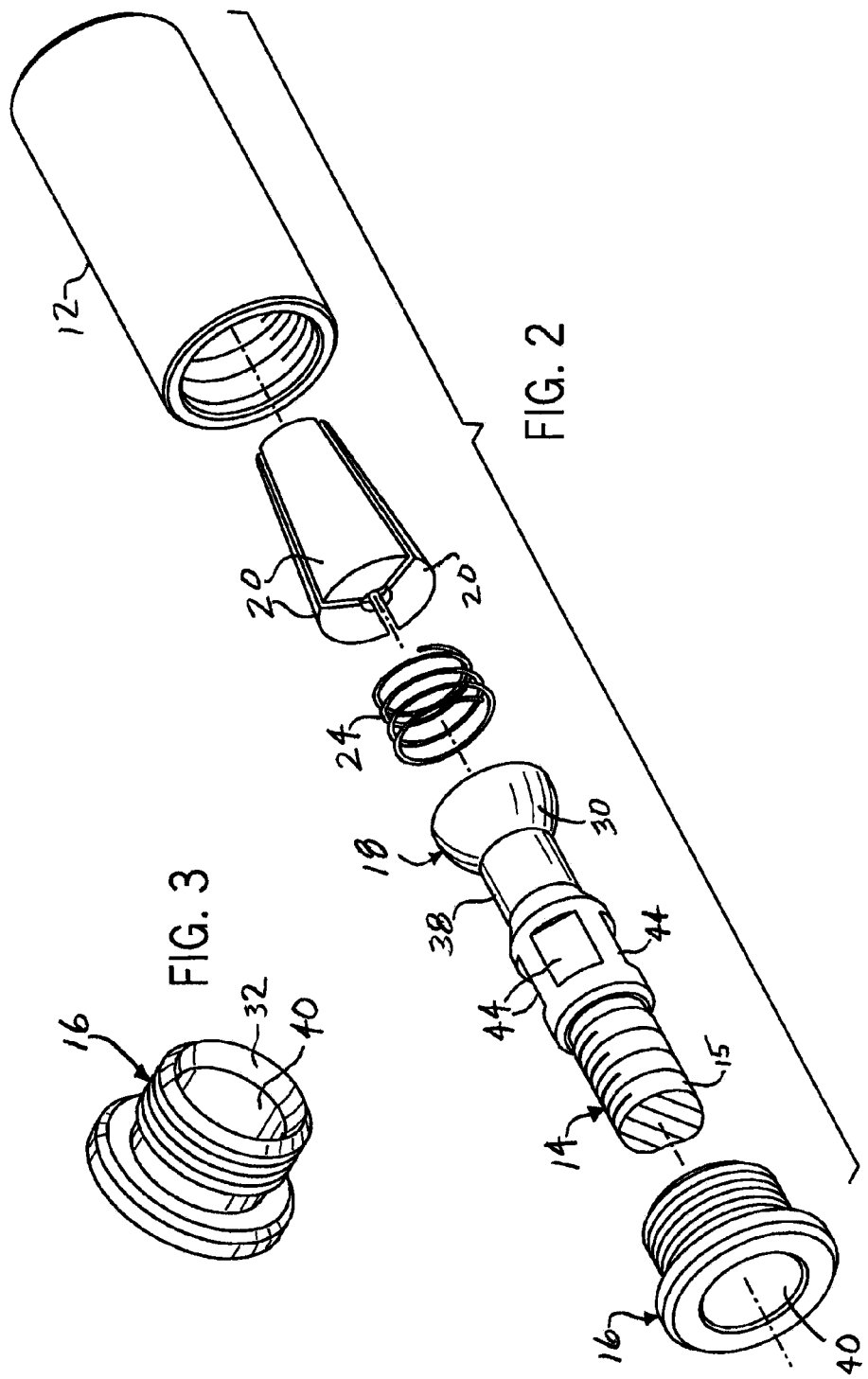

CABLE ANCHOR

CROSS-REFERENCE TO RELATED APPLICATION

This application is a continuation of U.S. patent application Ser. No. 12/120,503 filed May 14, 2008, now U.S. Pat. No. 8,051,615, which claims the benefit of U.S. Provisional Patent Application No. 60/938,366 filed May 16, 2007, both of which are hereby incorporated by reference.

STATEMENT CONCERNING FEDERALLY SPONSORED RESEARCH OR DEVELOPMENT

Not applicable.

FIELD OF THE INVENTION

This invention relates to an apparatus for anchoring the end of a cable to a structure such as a concrete pillar, post, or the like.

BACKGROUND OF THE INVENTION

This invention relates to cable anchors of the type disclosed in U.S. Pat. No. 4,899,499, the disclosure of which is hereby incorporated by reference. The anchor disclosed has a body with a wedge-shaped (conical) internal bore surface, cable grippers with wedge-shaped (conical) external surfaces received in the bore, a cable gripped by the grippers and extending from one end of the body, a cap at the opposite end attached to the body through which a stem extends outside of the body and the stem having a head that is captured against a facing surface of the cap. The stem is threaded into an insert that is embedded in a concrete structure. The facing surfaces of the cap and head are generally flat such that in this structure it is desirable that the axis of the stem and the axis of the cable be aligned. While that is ideal, that is not always the case in practice. In practice, there are often at least slight deviations between the axis of the cable and the axis of the stem, which stress the components of the connection. In addition, as the cables that are anchored oftentimes form barriers, even if the cable is initially aligned, at least generally, with the stem, an impact to the cable can result in significant stresses and deviations from aligned axes, which, even if temporary, can damage or even break the assembly. Corrosion inside the anchor, for example between the grippers and the body, the cable and the grippers and the cap and the stem, exacerbates the problem.

SUMMARY OF THE INVENTION

The invention provides an apparatus for anchoring the end of a cable to a structure with the head of the stem and the facing surface of the cap being shaped to allow articulation between the head of the stem and the cap while maintaining surface contact. Preferably, the mating surfaces of the head and cap are frusto-spherical in shape. Thereby, an anchor of the invention can accommodate misalignments between the axis of the cable and the axis of the stem, either upon initial construction, impact to the cable, or other changes that may occur during the life of the structure, such as vibrations and settling.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 2 is an exploded perspective view of an anchor of the invention;

FIG. 3 is a perspective view of the cap of FIG. 2 viewed in the opposite direction of FIG. 2.

DETAILED DESCRIPTION OF THE PREFERRED EMBODIMENT

Figure 1:
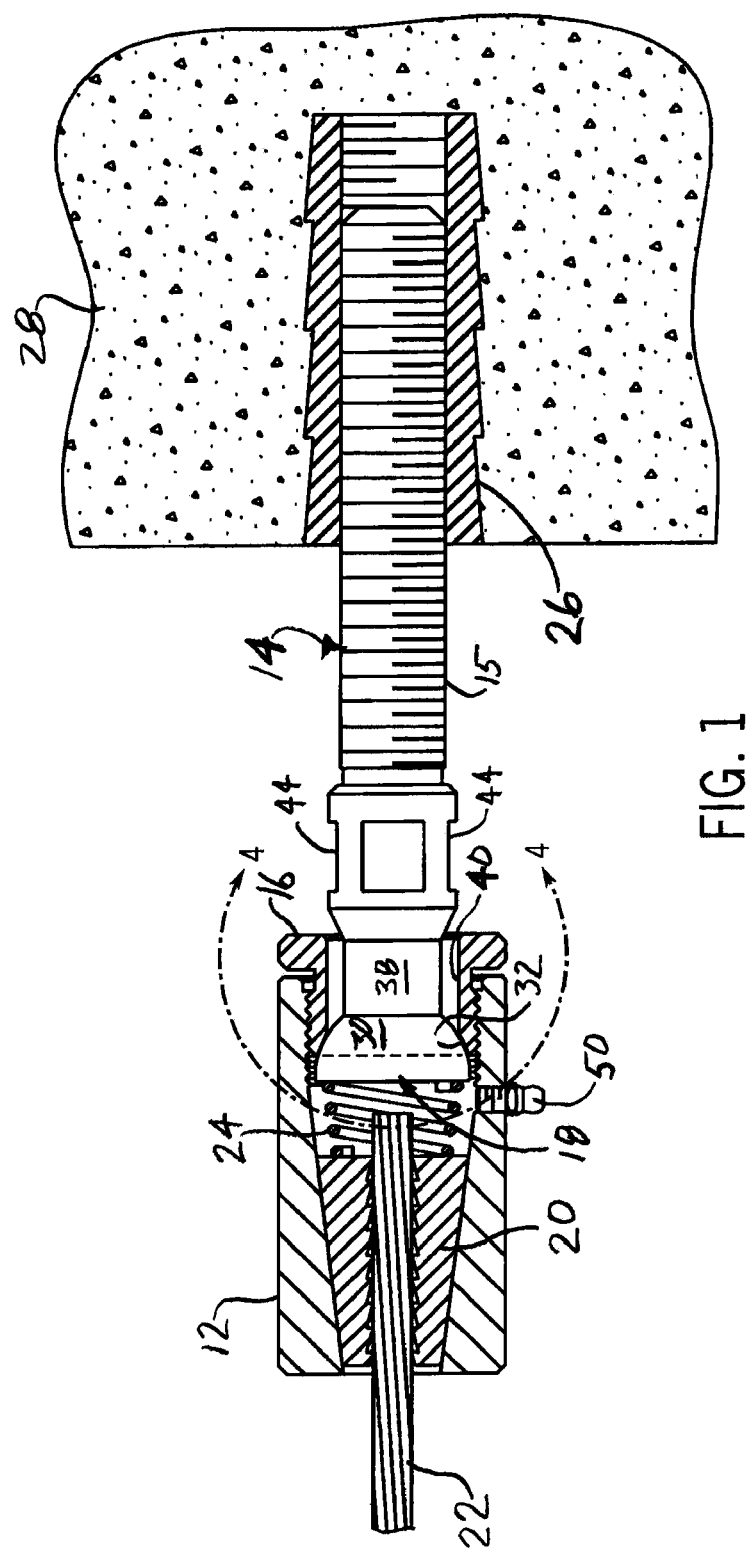
FIG. 1 is a cross-sectional view of an anchor of the invention installed in an insert embedded in a concrete structure and gripping the end of a cable.
Figure 4:
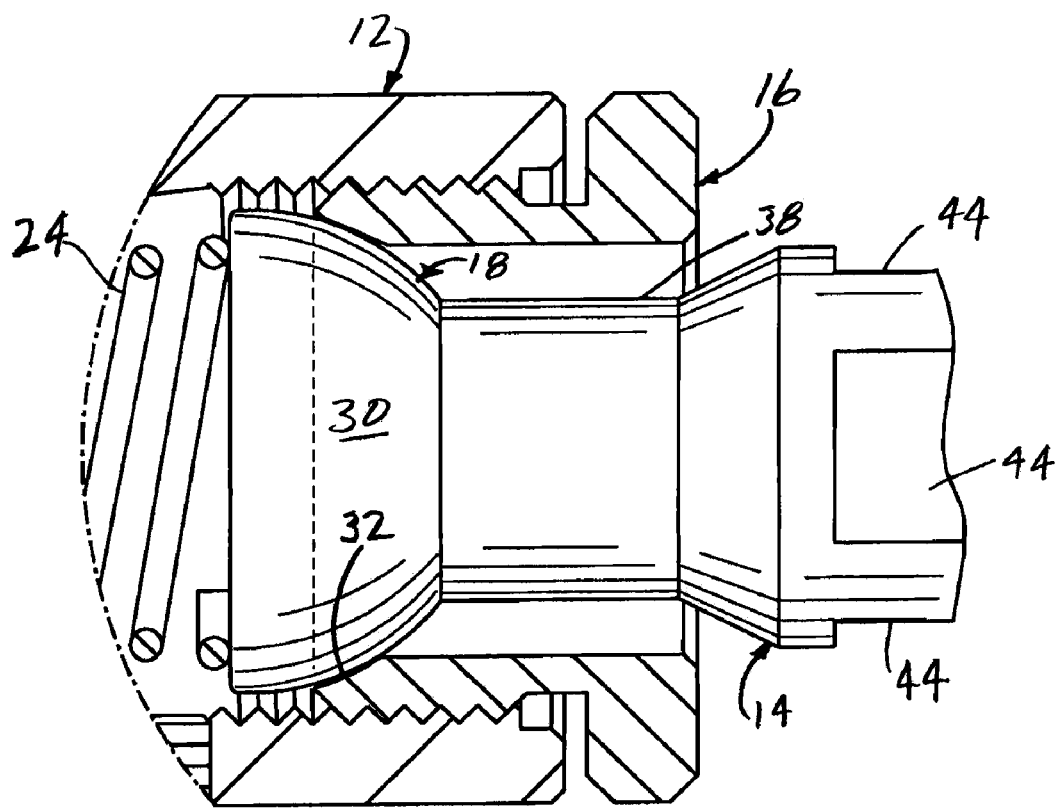
FIG. 4 is a detail cross-sectional view illustrating the mating surfaces between the stem and cap.

Referring to FIG. 1, an anchor 10 of the invention is illustrated including a chuck body 12, a stem 14, a cap 16 attached to the chuck body and capturing the head 18 of the stem, grippers 20 securing the end of a cable 22 in the bore of the chuck body, and a spring 24 in the bore of the chuck body urging the grippers 20 into engagement with the cable 22. Also illustrated in FIG. 1 is an insert 26 embedded in a concrete structure 28 into which a shank 15 of the stem 14 is threadedly fastened.

Referring to FIGS. 2 and 3, the head 18 of the stem 14 has a frusto-spherical surface 30 that mates with a frusto-spherical surface 32 of the cap 16. The mating frusto-spherical surfaces 30 and 32 permit articulation for 360° about the axis of the stem 14 relative to the cap 16. The range of articulation permitted from the aligned position illustrated is sufficient to accommodate typical impacts, vibrations and construction imperfections. Thereby, the anchor 10 can accommodate misalignments between the axis of the cable 22 and the axis of the stem 14 that may result from many different causes.

While it is preferred that frusto-spherical surfaces be formed on both of the head 18 and the cap 16, it may be possible to accomplish the advantages of the invention with other combinations of surfaces, for example, with just a frusto-spherical surface on the head 18 and a frusto-conical surface on the cap 16, or just line contact at the end of a circular bore of the cap 16.

The stem 14 also has a neck section 38 that extends through bore 40 of the cap 16 and is significantly smaller in diameter than the bore 40 so as to provide clearance to accommodate articulating motions of the stem 14 relative to the cap 16. This clearance is what determines the range of articulation permitted by the construction. In addition, preferably, where the stem 14 exits the cap 16 and is exposed, the stem 14 has flats 44 that can be engaged by a wrench to turn the stem 14 so as to threadedly engage the shank 15 with the insert 26. It is noted that the shank 15 as illustrated is externally threaded, but could alternatively be internally threaded.

The cable grippers 20 are conventional, for example, a set of two or three wedge-shaped jaws. Typically, the interior surface of the grippers 20 is formed with teeth, which may be formed by a thread cutting operation, and the exterior is a frusto-conical surface or a portion of a frusto-conical surface. The bore of the body 12 is a mating frusto-conical surface such that when the grippers 20 are urged leftwardly as viewed in FIG. 1, they clamp down on the end of the cable 22 and bite into it to firmly grip it. The spring 24 biases the grippers 20 in this direction to aid in initial gripping of the cable 22.

Preferably, the mating surfaces 30 and 32 are lubricated so as to reduce friction therebetween to take full advantage of the invention. Particularly when so lubricated, an anchor of the invention can accommodate and absorb even small misalignments between the cable 22 and the stem 14, such as may be caused by vibrations, to prevent vibrations from being transmitted either to or from the cable to the stem 14. Lubrication also reduces the stress on the assembly which may be caused by larger articulations, for example, from an impact, from the building settling, or during initial installation.

To assure adequate corrosion protection to protect the wedges 20, housing 12 and strand 22 interface, which is the most vulnerable area for corrosion to start, and also to lubricate and protect against corrosion of the mating surfaces of the head and cap, a grease zerc fitting 50 (FIG. 1) is preferably provided in the body 12, through which grease or another corrosion inhibitor may be introduced into the body 12. This also helps lubricate the surfaces 30 and 32 as discussed above.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

The invention claimed is:

1. In an anchor for connecting a cable to a structure, the anchor including a chuck body, a cap, and a stem, the chuck body including a wedge that grips the cable, and the chuck body threadably connecting to the cap, the stem including a shank that fixedly connects to the structure and a head that engages the cap, the improvement wherein:
the head of the stem is shaped as a truncated sphere so as to have a frusto-spherical convex surface that engages a concave surface of the cap to permit rotation of the stem relative to the cap and body; and
the wedge comprises a set of jaws that grips the cable.

2. The anchor of claim 1, wherein the head of the stem engages a frusto-spherical concave surface of the cap.

3. The anchor of claim 1, wherein the chuck body rotates at least 360° relative to the stem about an axis of the stem.

4. The anchor of claim 1, wherein the stem includes a neck section adjacent to the head of a smaller diameter than a diameter of a bore of the cap.

5. The anchor of claim 4, wherein a range of rotation of the chuck body relative to the stem about axes that are not collinear with an axis of the stem is determined by the neck section of the stem.

6. The anchor of claim 1, wherein the chuck body includes a fitting through which a lubricant is provided to an inside of the chuck body.

7. The anchor of claim 1, wherein the chuck body includes a spring that biases the frusto-spherical convex surface of the stem against the concave surface of the cap.

8. The anchor of claim 7, wherein the spring also biases the wedge to grip the cable.

9. The anchor of claim 1, wherein the chuck body has a wedge-shaped bore section and the set of jaws collectively have a generally wedge-shaped exterior surface adapted to be moved within and operatively wedged by the chuck body bore section into gripping engagement with a cable end positioned within the jaws.

10. The anchor of claim 1, further comprising a flat surface secured to the stem whereby the stem may be fastened to an insert by wrench engagement of the flat surface.

11. The anchor of claim 10, wherein the insert is set in concrete.

12. The anchor of claim 1, wherein the cap has a hole through which the stem extends and wherein the head of the stem is in rotatable sliding contact with the concave surface of the cap.

13. An anchor for connecting a steel cable to a concrete structure, comprising:
a chuck body;
a cap screwed into one end of the chuck body, the cap having in an end face thereof a hole that opens to a concave surface inside of the cap;
a stem including a shank and a head, the head being shaped as a truncated sphere so as to have a frusto-spherical convex surface that mates with the concave surface of the cap to permit articulation of the stem relative to the cap about 360 degrees, a neck of the stem extending through the hole in the cap with a clearance between the hole and the neck that permits said articulation of the stem relative to the cap and wherein the shank extends beyond the cap;
a wedge inside the chuck body, the wedge including a set of jaws;
wherein:
the end of the cable is received between the jaws of the wedge so as to grip the cable by the jaws inside the chuck body and tighten the grip of the jaws on the wedge as tension is applied to the cable, the cable extending from an end of the chuck body opposite from the one end to which the cap is screwed; and
the shank of the stem being fixedly connectable to the concrete structure.

14. The anchor of claim 13, wherein the chuck body includes a fitting through a side of the chuck body through which a lubricant can be provided to an inside of the chuck body.

15. The anchor of claim 13, further comprising a spring in the chuck body that biases the frusto-spherical convex surface of the stem against the concave surface of the cap.

16. The anchor of claim 15, wherein the spring also biases the wedge to grip the cable.

17. The anchor of claim 13, wherein the chuck body has a wedge-shaped bore section and the set of jaws collectively have a generally wedge-shaped exterior surface adapted to be moved within and operatively wedged by the chuck body bore section into gripping engagement with a cable end positioned within the jaws.

18. The anchor of claim 13, further comprising a flat surface secured to the stem whereby the stem may be fastened to an insert by wrench engagement of the flat surface.

19. The anchor of claim 18, wherein the insert is set in concrete.

20. A connection of a multi-strand steel cable to a structure, comprising:
an end of the multi-strand cable;
a concrete wall of the structure;
an anchor comprising:
a chuck body;
a cap screwed into one end of the chuck body, the cap having in an end face thereof a hole that opens to a concave surface inside of the cap;
a stem including a shank and a head with the head being shaped as a truncated sphere so as to have a frusto-spherical convex surface that mates with the concave surface of the cap to permit articulation of the stem relative to the cap about 360 degrees, a neck of the stem extending through the hole in the cap with a clearance between the hole and the neck so the shank extends beyond the cap and permits said articulation of the stem relative to the cap;
a wedge inside the chuck body, the wedge including a set of jaws;
wherein:
the end of the cable is received between the jaws of the wedge so as to grip the cable by the jaws inside the chuck body and tighten the grip of the jaws on the wedge as tension is applied to the cable, the cable extending from an end of the chuck body opposite from the one end to which the cap is screwed;
the shank of the stem is fixedly connected to the concrete wall of the structure.

* * * * *